(12) United States Patent
Travers et al.

(10) Patent No.: US 6,176,361 B1
(45) Date of Patent: Jan. 23, 2001

(54) FRICTION CLUTCH WITH LOW DECLUTCH FORCE

(75) Inventors: Jean Luc Travers, Andechy; Eric Breton, Versailles; Alfred Permuy, Rueil Malmaison; Jacques Thirion De Briel, Colombes, all of (FR)

(73) Assignee: Valeo, Paris (FR)

( * ) Notice: Under 35 U.S.C. 154(b), the term of this patent shall be extended for 0 days.

(21) Appl. No.: 09/117,145

(22) PCT Filed: Dec. 4, 1997

(86) PCT No.: PCT/FR97/02201

§ 371 Date: Aug. 18, 1999

§ 102(e) Date: Aug. 18, 1999

(87) PCT Pub. No.: WO98/25042

PCT Pub. Date: Jun. 11, 1998

(30) Foreign Application Priority Data

Dec. 5, 1996 (FR) .................................................. 96 15307
Jun. 17, 1997 (FR) .................................................. 97 07481

(51) Int. Cl.[7] ............................. F16D 13/58; F16D 13/75
(52) U.S. Cl. ..................................... 192/70.25; 192/70.27; 192/89.23
(58) Field of Search ............................. 192/70.25, 70.27, 192/89.23

(56) References Cited

U.S. PATENT DOCUMENTS

| 5,636,721 | * | 6/1997 | Weidinger | 192/70.27 |
| 5,715,920 | * | 2/1998 | Lindner et al. | 192/70.25 |
| 5,758,756 | * | 6/1998 | Weiss et al. | 192/70.25 |

FOREIGN PATENT DOCUMENTS

| 2120329 | 11/1983 | (GB) . |
| 2286640 | 8/1995 | (GB) . |
| 2296541 | 7/1996 | (GB) . |

* cited by examiner

Primary Examiner—Richard M. Lorence
(74) Attorney, Agent, or Firm—Liniak, Berenato, Longacre & White (57) ABSTRACT

The friction clutch comprises a cover (8) with a base (80), a pressure plate (3) with a front friction face (30) for co-operating with a clutch friction and, set between the pressure plate (3) and the base (80) of the cover (8), a diaphragm (2) with a peripheral part extended inward by fingers (23) to oppose at will, by means of a nose (11) of a clutch bearing (10), the action of said peripheral part (21), a booster elastic washer (7) acting on the fingers (23) of the diaphragm (2) in the declutching direction resting on the cover (8): the booster washer (7) is arranged between the cover (8) and the leading-edge piece or nose (11) such that it is adapted to operate on the fingers (23) of the diaphragm (2) via said leading-edge piece or nose (11).

15 Claims, 6 Drawing Sheets

FRICTION CLUTCH WITH LOW DECLUTCH FORCE

BACKGROUND OF THE INVENTION

1. Field of the Invention

The present invention relates to friction clutches with a low declutching force, especially for motor vehicles.

2. Description of Related Art

As is known, in a conventional clutch interposed between a driving shaft and a driven shaft, a diaphragm bears on the base of a cover plate, which is fixed to a rotary driving flywheel, so as to displace a pressure plate towards the said flywheel which constitutes a reaction plate, in order to grip the friction liners of a clutch friction wheel between the said pressure and reaction plates.

The driving flywheel is fixed in rotation to a first shaft such as a driving shaft, while the clutch friction wheel has at its inner periphery a hub for mounting it on a second shaft, such as a driven shaft, for rotation therewith.

The clutch is accordingly normally engaged, or clutched, with torque transmission between the driving and driven shafts.

In order to disengage, or declutch, the clutch, it is necessary to act axially with the aid of a clutch release bearing, by pushing in the case of a clutch of the push-to-release type, on the inner end of the fingers of the diaphragm in order to cause the said diaphragm to pivot and overcome the force which is exerted by the diaphragm on the pressure plate, which is movable axially so as to release the friction liners. The torque is then no longer transmitted from the driving shaft to the driven shaft, because the friction liners are no longer gripped between the pressure and reaction plates which are fixed to the cover plate for rotation with the latter.

Typically, the cover plate, the pressure plate and the diaphragm constitute a unitary assembly referred to as a clutch mechanism, which is assembled through its cover plate on the flywheel, with resilient tongues coupling the pressure plate to the cover plate for rotation together but with axial mobility.

As is known, the diaphragm has a central hole and includes an external peripheral portion in the form of a Belleville ring which is extended inwardly by a central portion divided into radial fingers by slots.

The diaphragm bears on the cover plate and on the pressure plate through its Belleville ring portion. Thus, the declutching device of the clutch, which enables the action of the resilient clutch engaging means to be counteracted at will, consists of the fingers of the diaphragm, on the inner ends of which the clutch release bearing acts, while the Belleville ring of the diaphragm constitutes axially acting resilient clutch engaging means for gripping the friction liners between the pressure and reaction plates, and therefore for biasing the pressure plate axially away from the base of the cover plate.

In the free state, the diaphragm is frusto-conical in form. Once it is mounted in the clutch, its Belleville ring is mounted under prestress and is more or less flat. During the declutching operation or operation of disengaging the clutch, the conicity of its Belleville ring is changed.

As is known, the characteristic curve of the diaphragm which represents the force exerted as a function of the course of declutching travel, taken for example at the level of the inner ends of the fingers of the diaphragm, is determined by the dimensions of its Belleville ring, and especially by the ratio between the height of the frustum of a cone of the Belleville ring in the free state and the thickness of the diaphragm.

This characteristic curve generally passes through a maximum.

Thus, the force to be exerted on the inner ends of the fingers of the diaphragm during the declutching operation increases to a maximum value, diminishes gradually down to a minimum, and then increases once again.

The difference between the maximum and minimum values may be large. For more detail as to this characteristic curve, reference should be made for example to the document FR-A-1 392 569.

In the document FR-A-1 392 569, a resilient progressive engagement device is provided outside the clutch friction wheel, for preventing the above mentioned maximum value being passed through during the declutching operation. This device is arranged in series with the Belleville ring of the diaphragm, and has an elastic force which is significantly less than that of the Belleville ring. The device has a course which is limited between a prestress position in which its force is at a maximum, and a stress position in which its force is at a minimum.

With this arrangement, a generally increasing declutching force is obtained at the clutch release bearing.

It is not possible to obtain, during the declutching operation, as great an assistance as is desired, since the progressive engagement device reduces the force exerted by the diaphragm on the pressure plate during the declutching operation.

The load curves of the progressive engagement device, which is typically mounted within the clutch friction wheel, and of the diaphragm, have profiles which do not enable them to be combined so as to obtain a high degree of assistance in declutching, in particular if it is desired to have regard to the compatibility of courses of declutching travel, and declutching forces, with current declutching control means. In addition, the profile of the curve of the progressive engagement device changes very rapidly as the clutch becomes older, and this cancels out the assistance given to the declutching operation to an extent that is greater, the higher the demand for such assistance. In order to prevent the curvature of the assistance device becoming set with ageing of the latter, it is preferable to locate it in a position in which its stiffness curve will remain stable over time, and in particular, in a position in which it is placed outside the zone of the progressive engagement of the friction wheel, in which liner contact and incrustation effects develop and cause the progressive engagement curve to change.

Consideration may then be given to providing an assistance spring, to act in parallel with the diaphragm. In that case, the assistance spring, which may for example be in the form of a Belleville ring, can engage on the cover plate and on the inner ends of the fingers of the diaphragm.

In the engaged condition of the clutch, it may then exert a minimum force, and then, as its conicity varies, exert an assistance force during the declutching operation; this assistance force is preferably at a minimum value in the engaged condition of the clutch.

SUMMARY OF THE INVENTION

An object of the present invention is to provide, in a simple and inexpensive way, a low declutching force friction clutch to which springs acting in parallel are also applicable.

Thus, in accordance with the invention, a friction clutch, especially for motor vehicles, comprising a cover plate with a transversely oriented base portion and fastening means for fastening it on a rotary driving flywheel, a pressure plate having a front friction surface for cooperation with a clutch friction wheel, means for coupling in rotation, with axial mobility, the pressure plate with the cover plate, and, interposed between the pressure plate and the base portion of the cover plate, a diaphragm having an outer peripheral portion axially biasing the pressure plate away from the base portion of the cover plate and extended inwardly by fingers for counteracting the action of the said peripheral portion at will through the actuating element or nose of a clutch release bearing, a resilient assistance ring acting on the fingers of the diaphragm in the declutching direction with engagement on the cover plate, is characterised by the fact that the assistance ring is disposed between the cover plate and the actuating element or nose of the clutch release bearing, so that it is adapted to act on the fingers of the diaphragm through the said actuating element or nose.

Preferably, the elastic characteristics of the assistance ring are so chosen that, when the clutch is engaged, the clutch friction wheel being new, the action exerted by the assistance ring is very small or zero.

Preferably, the said action is very weak, so as to exert a predetermined (specified) preloading force on the actuating element so that the said element will be in permanent engagement on the diaphragm.

When the clutch is engaged, the assistance ring replaces the preloading spring which is usually associated with the clutch release bearing. The actuating element is then in permanent engagement on the fingers of the diaphragm.

The said assistance ring thereafter has a double function, and thus prevents any relative angular movement between the actuating element, which is fixed to the rotating ring of the rolling bearing which is part of the clutch release bearing, and the diaphragm.

In this way, wear is reduced while the working life of the clutch release bearing is increased, due to the fact that the rolling bearing of the latter is in permanent rotation.

Preferably, the elastic characteristics of the assistance ring are so chosen that, during the declutching operation, the action exerted by the assistance ring increases and then decreases to a predetermined value which may be very low or zero, the clutch being disengaged.

Preferably, the fingers of the diaphragm being separated by radial slots which are open into holes located at the inner periphery of the peripheral portion of the diaphragm, the clutch being of the push-torelease type, the assistance ring is situated generally radially inwardly of the zone defined by the holes in the diaphragm.

Preferably, the assistance ring bears on the cover plate on the face of the base portion of the latter that faces towards the pressure plate; the assistance ring bears on a rounded edge of the central aperture of the base portion of the cover plate.

Preferably, the assistance ring bears on the cover plate through heads of rivets that pass through the holes in the diaphragm and which extend the body of the said rivets outside the cover plate; the assistance ring is coupled to the cover plate for rotation therewith; this coupling together in rotation is obtained by a bayonet fitting; the rotational coupling is obtained by means of pins which are carried by the base portion of the cover plate and with which slots, formed at the outer periphery of the assistance ring, cooperate; the thrust ring can be separate from the cover plate or may project from the latter, being formed by stamping out.

Preferably, the clutch is of the pull-to-release type, and the assistance ring bears on the outer face of the base portion of the cover plate, preferably through a thrust ring; the base portion of the cover plate has external lugs for axial retention of the assistance ring; the thrust ring can be separate from the cover plate or may project from the latter, being formed by stamping out Preferably, the assistance ring is of cut-out form at its inner periphery, so as to define extensions which cooperate with the actuating element or nose.

Displacement of the clutch release bearing may be obtained using an electronic control system.

Preferably, the clutch is equipped with a device for compensating for wear in at least the liners of the clutch friction wheel.

BRIEF DESCRIPTION OF THE DRAWINGS

The following description illustrates the invention with reference to the attached drawings, in which.

DETAILED DESCRIPTION OF PREFERRED EMBODIMENT

Figure 1:
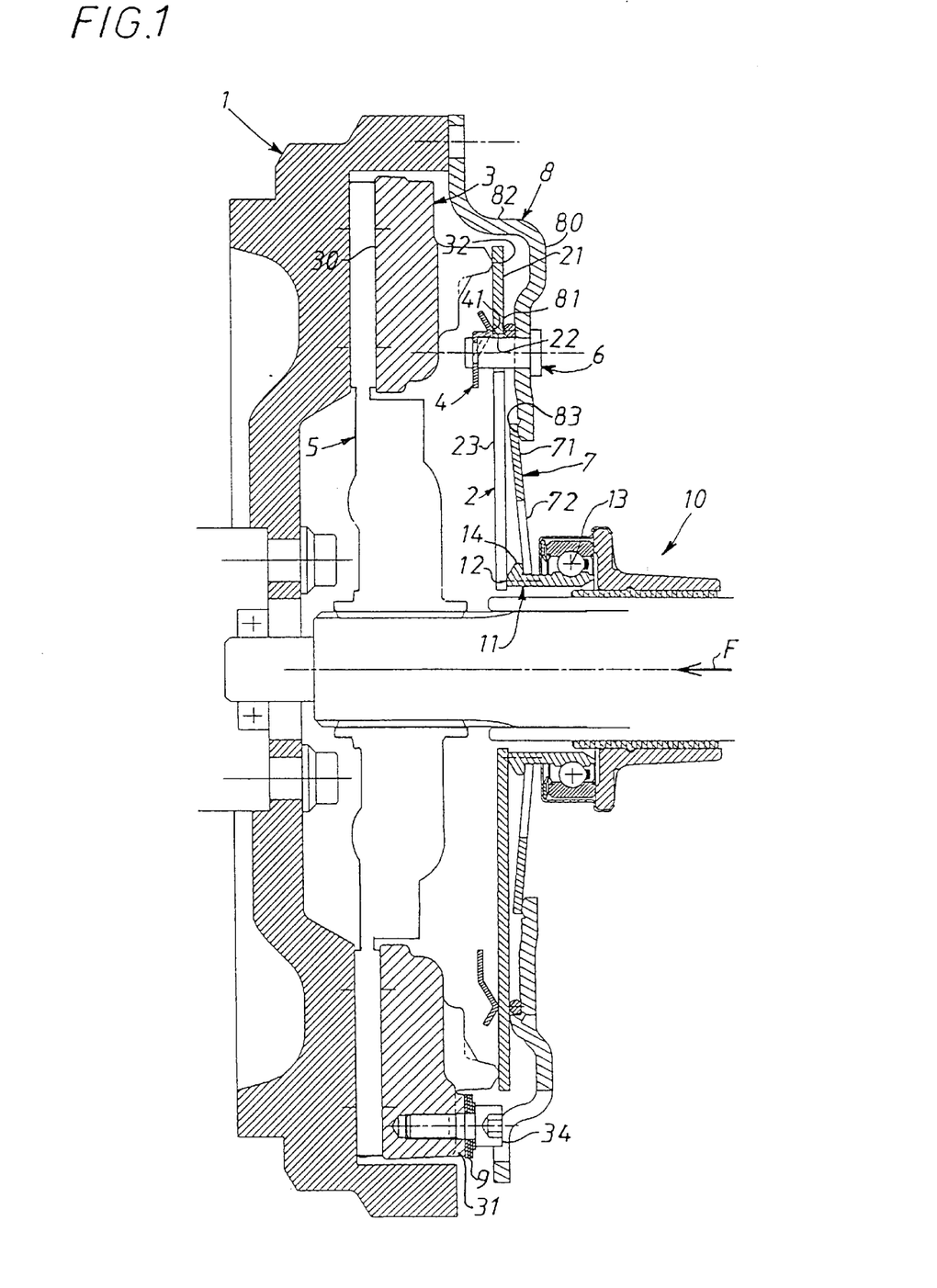
FIG. 1 is a view in axial cross section of a clutch of the push-to-release type, in accordance with the invention, in the engaged condition of the clutch.

A clutch, as is shown in FIG. 1, includes an assembly of annular components, namely, in axial succession, a rotary driving flywheel 1, for fixing the clutch to a first shaft, such as a driving shaft, a clutch friction wheel shown in outline at 5 and having friction liners at its outer periphery and, at its inner periphery, a hub for coupling the clutch in rotation with a second shaft such as a driven shaft, a pressure plate 3, a hollow cover plate 8 having a base portion 80 which is oriented generally transversely and has a central hole, and, at its outer periphery, fastening means for fastening the cover plate 8 to the flywheel 1, which constitutes a reaction plate.

The flywheel 1 has a friction surface on its back side, and central holes for fastening it, by means of screws, to the driving shaft. The flywheel 1 is a single component, being in mouldable material, as is the pressure plate 3, the front face of which is a friction surface 30 facing towards the friction surface of the flywheel 1.

The flywheel 1 and the pressure plate 3 are castings.

The clutch friction wheel 5 also includes a support disc for carrying the friction liners, which may be of divided form. These liners lie on either side of the support disc, to which they are secured for example by riveting, adhesive bonding or brazing to the metallic support disc.

In a known way, resilient, axially acting, progressive engagement means are interposed between the two liners for the progressive gripping of the latter between the flywheel 1 and the pressure plate 3. These means may take any appropriate form. These means are for example made so as to match the support disc. This disc, by way of non-limiting example, may have a central portion for connecting it to the hub, either elastically or otherwise, together with a peripheral portion which is divided into radial blades, for example of the tripod type. Each blade then has a central support zone which is adapted for one of the friction liners to be fastened on it, together with two external peripheral support zones which are arranged to cooperate with the other friction liner.

As mentioned above, the disc may be coupled elastically to the hub. In another version, the disc is coupled rigidly to the hub, and the flywheel 1 can then be divided so as to constitute two masses which are coupled together elastically by means of circumferentially or radially acting springs.

In a further version, the flywheel 1 may be in two parts, and include a support plate fixed at its inner periphery to the driving shaft and at its outer periphery to a reaction plate having the friction surface. The cover plate 8 can then be assembled to the flywheel 1 in two parts with the aid of axially oriented lugs which project from its cylindrical peripheral skirt portion 82. These lugs, which are in the form of tenons, are then engaged in the mortices formed in the outer periphery of the reaction plate or in that of the support plate. The free portion of the lugs, constituting the above mentioned fastening means for the cover plate 8, can be secured to the support plate or to the reaction plate by seaming, upsetting or welding, in the manner described for example in French patent application 95 12523 filed on Oct. 24, 1995.

Figures 2, 3:
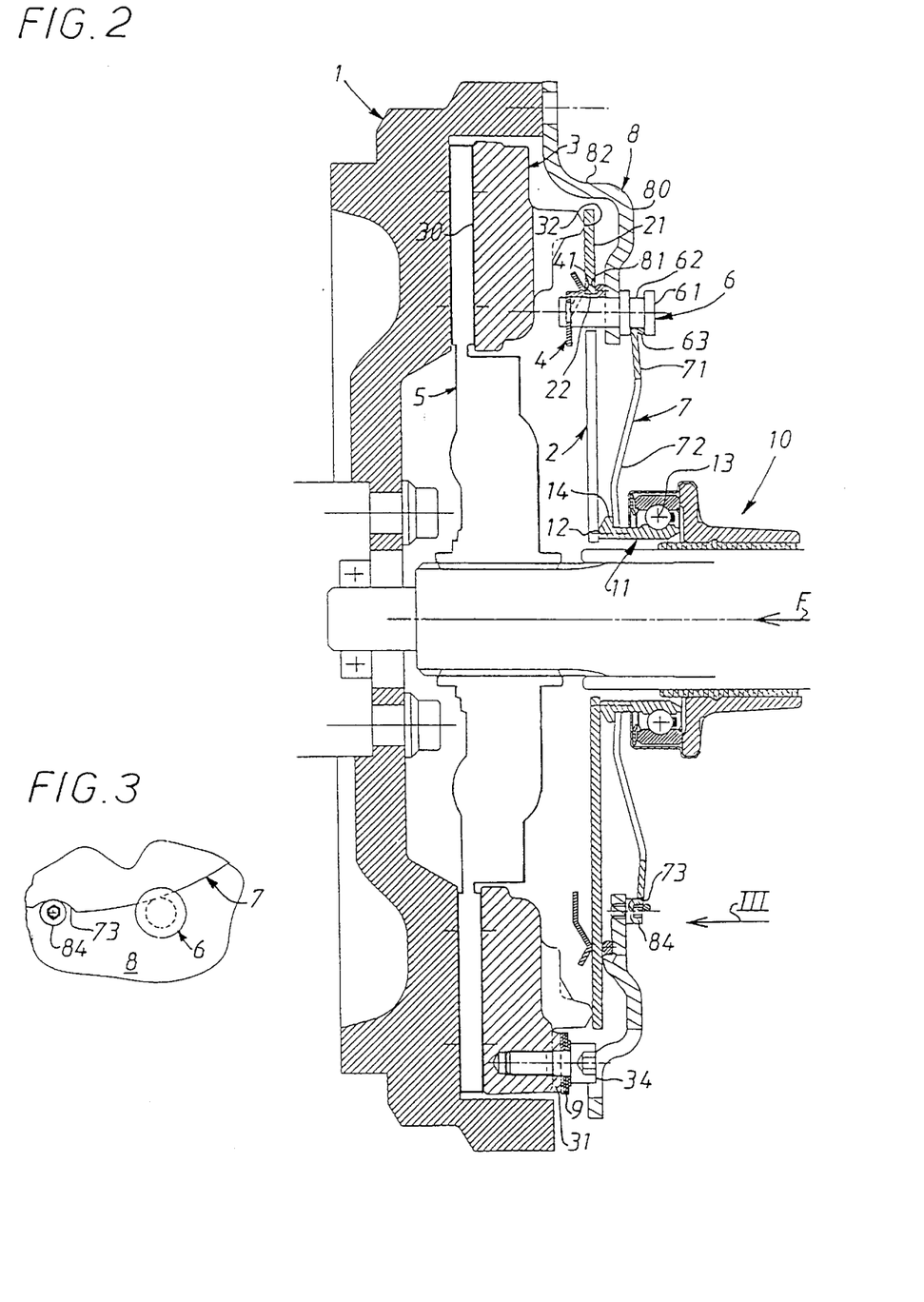
FIG. 2 is a view, in axial cross section, of another version of the clutch as compared with FIG. 1.
FIG. 3 is a partial view in the direction of the arrow III in FIG. 2.

In the present case, and also in FIG. 2, the cover plate 8 has a conventional form and has a radial flange for fastening it to the flywheel 1, which has an axially oriented annular skirt portion surrounding the pressure plate 3; the cover plate 8 is hollow in form, but it may of course be of flat form where the skirt portion of the flywheel is extended axially.

In the context of application to a motor vehicle, the driving shaft is the engine shaft of the vehicle on the crankshaft of which the flywheel 1 is secured, while the driven shaft consists of the input shaft of the gearbox.

It is of course possible to reverse the structures, whereby the first shaft can be a driven shaft and the second shaft a driving shaft.

In this Figure, the pressure plate 3 is coupled in rotation to the cover plate 8 by means of resilient tongues 9 which enable the pressure plate 3 to be displaced axially with respect to the cover plate 8. The pressure plate 3 is then fixed to the cover plate 8 and the flywheel 1 for rotation therewith, while being axially movable with respect to these latter.

The tongues 9 in this example are oriented tangentially, and bias the pressure plate 3 towards the base portion 80 of the cover plate. These resilient tongues 9 therefore act axially and have a return action. In another version, the tongues may be oriented radially.

The tangential tongues 9 are fixed at one of their ends to lugs 31 projecting axially from the pressure plate 3, and at their other end to a radial portion of the cover plate. The tongues 9 are spaced apart circumferentially at regular intervals in a known way; their number, and that of the lugs 31, depends on the application, given that for cruising vehicles, there are generally three tongues 9 or groups of tongues.

Fastening of the tongues 9 on the portions of the cover plate and on the lugs 31 is obtained by means of fastening means 34, which in this example are screws but which in another version are rivets.

The pressure plate 3 is displaceable axially under the biasing action of axially acting clutch engaging means controlled by declutching means, in this example a diaphragm 2 which is articulated on the cover plate 8; the diaphragm 2, which is of frusto-conical form in the free state in the known way, comprises a peripheral portion 21 in the form of a Belleville ring which is extended internally by fingers 23 separated by radial slots, which are open into holes 22 located at the inner periphery of the peripheral portion 21 of the diaphragm 2.

In this example the clutch is of the push-to-release type, that is to say it is necessary to act, with the aid of a clutch release bearing 10, by exerting a thrust on the inner ends of the fingers 23 so as to disengage the clutch in the direction corresponding to the arrow F.

To this end, the base portion 80 of the cover plate carries, firstly, a primary abutment 81 which in this example consists of a pressed-out element formed in the base portion 80 of the cover plate 8, and secondly, a secondary abutment 41 which consists of a rounded edge formed at the outer periphery of a seating ring 4, which is secured to the cover plate 8 by means of rivets 6, with the primary abutment 81 and secondary abutment 41 being radially in line with each other; the rivets 6 extend through some of the holes 22 in the diaphragm 2.

On the same side as the pressure plate 3, the diaphragm 2 bears on the latter, radially outside the abutments 81 and 41, in abutment zones 32 of arcuate form which are centred on the axis of the clutch which is defined by the pressure plate 3 on its face that faces towards the base portion 80 of the cover plate 8.

A resilient assistance ring 7, bears on one side on an element which is fixed with respect to the cover plate 8, and on the other side it acts on the fingers 23 of the diaphragm 2, so that it is adapted to act in the declutching direction of the clutch.

More precisely, and in accordance with the invention, the assistance ring 7 is disposed axially outside the diaphragm 2, being located radially at least in line with the fingers 23 of the diaphragm 2; in this example, the assistance ring 7 is located generally radially within the zone bounded by the holes 22 of the diaphragm 2; in the present case the assistance ring 7 comprises an outer, Belleville ring, portion 71 which is extended radially towards the axis by extension portions 72 which are separated by radial slots; these extension portions 72 extend generally towards the free end of the fingers 23 of the diaphragm 2. It is of course possible to reverse the structure, with the extension portions then extending the ring radially away from the axis.

In the present case, the outer periphery of the Belleville ring portion 71 of the assistance ring 7 is in engagement on a rounded edge 83 which faces towards the pressure plate 3, and which includes the central aperture of the base portion 80 of the cover plate 8. The rounded edge 83 is formed on the inner periphery of the base portion 80.

In accordance with the invention, the assistance ring 7 acts on the fingers 23 of the diaphragm 2 through the clutch release bearing 10.

More precisely, the clutch release bearing 10 includes a thrust element or nose 11, the axial end 12 of which cooperates with the fingers 23 of the diaphragm 2 for disengaging the clutch; the nose 11, which is of generally cylindrical form, has in a manner known per se the internal rolling track for balls 13 at its outer periphery, the bearing 10 being in this example of the ball bearing type; the nose 11 has a transverse circular flange 14 in the vicinity of its end 12, and it is with the face of this flange 14 located opposite to the end 12 that the free ends of the extension portions 72 of the assistance ring 7 cooperate so as to act on the fingers 23 of the diaphragm 2.

The assistance ring 7 has elastic characteristics such that, when the clutch is engaged and the friction liners of the clutch friction wheel are new, it exerts no axial force on the fingers 23 of the diaphragm 2; the force gripping the liners clamped between the reaction plate 1 and the pressure plate 3 is such as is given by the peripheral portion 21 of the diaphragm 2; when a force is applied on the fingers 23 of the diaphragm 2 in the direction of the arrow F so as to disengage the clutch, the assistance ring 7 acts on the fingers 23 of the diaphragm 2, again in the direction of the arrow F, through the clutch release bearing 10, by engagement on the cover plate 8 through the rounded edge 83, so alleviating the force necessary for the declutching operation; it is also arranged that, at the end of the declutching operation, corresponding for example to the end of the limited course of travel of the clutch release bearing, the assistance ring 7 transmits no force to the diaphragm 2.

As can be seen, as a result of the invention, in this example an assistance ring 7 has been associated with a diaphragm without it being necessary to modify the cover plate 8 significantly; in addition, the latter has been located in a free space, and its presence has not significantly affected the axial size of the clutch mechanism.

Preferably, the resilient characteristics of the assistance ring 7 are such that, when the clutch is engaged, it produces an axial so-called preloading force, which biases the end 12 into contact with the inner ends of the fingers 23 of the diaphragm 2, so that in a known way it maintains the nose 11 in permanent engagement against the fingers 23, and prevents any relative angular movement, and this reduces wear.

In another version, the axial force produced by the assistance ring 7 is zero when the clutch is engaged, and a conventional preloading spring is provided in association with the clutch release bearing.

In the modified version in FIG. 2, the abutment of the assistance ring 7 on the cover plate 8 is carried by a head 61 of the rivets 6; more precisely, the body of the rivet 6 is extended on the outside of the cover plate by a head 61 which is formed with a circular groove 62 that receives the outer periphery of the peripheral portion 71 of the assistance ring 7; when the assistance ring 7 transmits a force to the nose 11 of the clutch release bearing 10 in the direction of the arrow F, it bears on the wall which bounds the groove 62 transversely and which is furthest away from the base portion 80 of the cover plate 8; a thrust ring 63 is preferably disposed between this wall and the assistance ring 7.

Where an assistance ring 7 is chosen which transmits a low axial force, such as the above mentioned preloading force, or a zero force, in certain positions of the diaphragm 2, such as for example those in which the clutch is engaged with new liners as explained above, it is preferable to avoid in these positions any relative movement between components which would lead to wear; in this example, the assistance ring 7 is fixed to the cover plate 8 for rotation with the latter by means of pins 84, of which there may for example be three, spaced apart circumferentially by equal amounts, with which there cooperate slots 73 formed at the outer periphery of the assistance ring 7. These slots 73 enable the assistance ring to be fitted by a bayonet mounting.

Thus the slots 73 are introduced to the heads 61 of the rivets 6, and rotation is then carried out, and the pins 84 are fitted. The pins 84 are preferably in the form of self-tapping screws.

It will be noted that the extension portions 72, in the form of fingers, enable the assistance ring 7 to be mounted on the nose 11 by deformation of the extension portions 72, so that the latter will come into engagement with the flange 14.

It will be noted that, in this Figure, the assistance ring 7 is located outside the cover plate 8, on the side of the latter opposite to the pressure plate 3, whereas in FIG. 1 the assistance ring 7 is fitted at its outer periphery between the cover plate 8 and the diaphragm 2.

Figure 4:
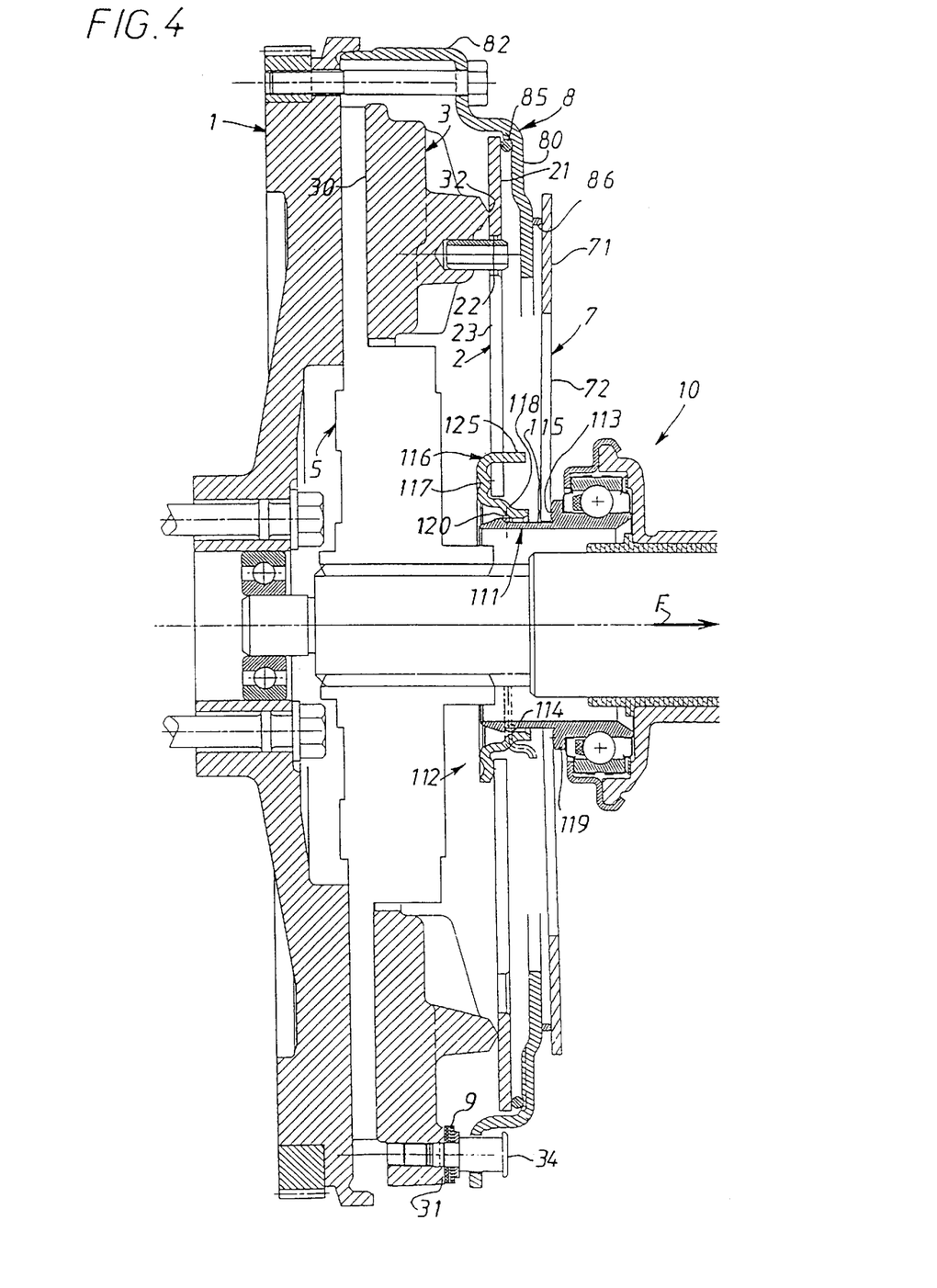
FIG. 4 is a view in axial cross section of a clutch according to the invention, of the pull-to-release type.

FIG. 4 shows the application of the invention to a clutch of the pull-to-release type; in this Figure, those components which are identical to those in the preceding versions, or which have the same function, carry the same references. The clutch being of the pull-to-release type, the diaphragm 2 is in engagement on the cover plate 8 through its outer periphery, in this example through a thrust ring 85, and its two abutments 85 and 32 are inverted radially, with the thrust ring being located radially outwards of the abutment 32; disengagement of the clutch is obtained by acting on the ends of the fingers 23 of the diaphragm 2 in the direction of the arrow F in FIG. 4. In this example, the skirt portion 82 of the cover plate 8 is of divided form, so as to constitute spacers between the flywheel 1 and the radial fastening flange of the cover plate 8 serving as an abutment to the heads of the fastening screws. The spacers surround the pressure plate 3.

For this purpose, the clutch release bearing 10 is adapted for this pull-to-release type of clutch; for the pulling action of the clutch release bearing 10 on the diaphragm 2, a coupling assembly 112 is employed.

The clutch release bearing 10 includes an actuating element or nose 111 which has a cylindrical annular groove 115, bounded at its outer periphery by a transverse shoulder 114.

The coupling assembly 112 comprises, firstly, a coupling member 116, which in this example is press-formed from sheet metal and which has a collar portion 117 for its engagement on the diaphragm 2, on the side of the latter opposite to the clutch release bearing 10, with, in this example, a curved transverse profile, and, integral with the said collar portion 117, a sleeve portion 118 which is arranged to pass axially through the said diaphragm 2 via its central aperture, between the diaphragm 2 and the actuating element 111 of the clutch release bearing 10, and secondly, within the said sleeve portion 118 of the coupling member 116 and between the latter and the said actuating element 111, an annular toroidal coupling ring 120 which is resiliently deformable in the radial direction and which is adapted to be attached to the clutch release bearing 10 by simple snap-fitting of the latter, at least in the axial direction which, going from the collar portion 117 to the coupling ring 120, and as indicated by the arrow F in FIG. 1, corresponds as desired to the exertion of a pulling force on the diaphragm 2 by the clutch release bearing 10.

The coupling ring 120 lies in a plane substantially at right angles to the axis of the assembly; it is made of round wire and is open, having two fingers, each of which, passing through the sleeve portion 118 of the coupling member 116 via two openings in the latter, of which there is one opening per finger, constitutes gripping means beyond the said generally axially oriented sleeve portion 118; for holding it with respect to the latter in cooperation with the fingers, it has in its plane at least one tenon which extends radially in engagement with a passage formed in the sleeve portion 118.

For retaining the assembly in facing relationship with the diaphragm 2, the collar portion 117 of the coupling member 116 has, from place to place on its outer periphery, lugs 125 which extend axially in the same direction as the sleeve portion 118, with each of them passing through the diaphragm 2 through a respective one of the slots which are formed between the fingers 23 of the latter.

Outside the sleeve portion 118 of the coupling member 116, the two fingers of the coupling ring 120 are hooked elastically together, in such a way that the coupling ring 120 is closed circumferentially on itself without being stressed. In other words, in the free configuration, or rest state, of the coupling ring 120, its fingers are spaced elastically away from each other, while its diameter is increased.

The clutch release bearing 10 is presented axially so as to be snap-fitted on the coupling ring 120 by means of the transverse shoulder 114 of its actuating element 111, producing elastic radial deformation of the coupling ring.

As mentioned above, when the clutch is engaged, the assistance ring 7 preferably maintains the collar portion 117 in contact with the internal face of the fingers 23 of the diaphragm 2 by exerting an axial preloading force via the ring 120.

When the said clutch release bearing is subsequently displaced in the direction of the arrow F in FIG. 4, the coupling ring 120, trapped between its transverse shoulder 114 and the sleeve portion 118 of the coupling member 116, ensures its attachment to the latter, and its tractive force is thereafter transmitted to the diaphragm 2 through the said coupling member 116; more precisely, and in a known way, the ring 120 is trapped between its shoulder 114 and a frusto-conical portion of the sleeve portion 118.

Facing the shoulder 114, the groove 115 of the actuating element or nose 111 is bounded by a transverse face 113 of a collar portion 119 formed at the outer periphery of the actuating element or nose 111. It is with this transverse face 113 that the inner periphery of the assistance ring 7 cooperates so as to act in the direction of the arrow F on the actuating element or nose 111 of the clutch release bearing 10, by bearing, in this example, on the outer face of the base portion 80 of the cover plate 8, preferably through a thrust ring 86 or a press-formed ring element projecting from the base portion 80 of the cover plate 8.

As can be seen in FIG. 4, the transverse face 113, with which the assistance ring 7 cooperates, is preferably of convex form, with its convexity facing towards the pressure plate 3.

The preloading force exerted by the assistance ring 7 also, in this example, enables the ring 120 to be trapped permanently between the sleeve portion 118 and the shoulder 114.

Figure 5:
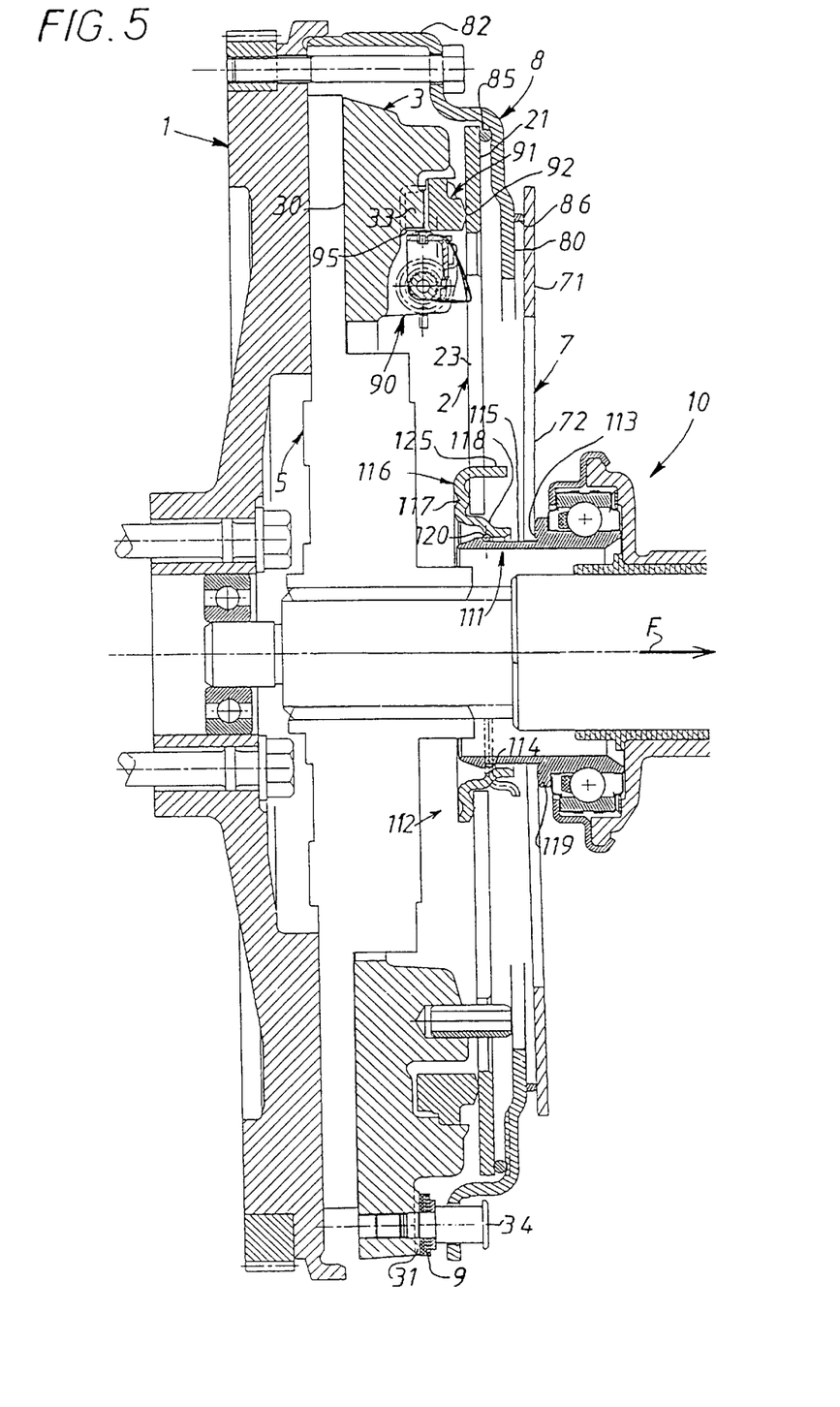
FIG. 5 is a view in axial cross section showing another version of the clutch of FIG. 4, equipped with a wear compensating device.

FIG. 5 shows a clutch of the same type as that in FIG. 4, having a wear compensating device 90.

In this connection, it is relevant to make use of an adjusting device, or so-called wear compensating device, which maintains the diaphragm always in the same general position, regardless of the state of wear in the friction liners of the clutch and/or the friction surfaces of the pressure and reaction plates, in order that the assistance spring will exert a very low force when the clutch is in its engaged or disengaged position under all circumstances during the useful life of the clutch, as explained above.

The wear compensating device 90 has been described in detail in the French patent application filed on the same day as that of the present Application, to which it is convenient to refer for more information, and the corresponding description should be considered as forming part of the present Application; it will simply be repeated here that the wear compensating device 90 includes ramp means 91 having inclined ramps 95; they consist of an annular ring 91 which has circumferentially disposed ramps; the said ring 91 also has engagement zones 92 consisting of a rounded upper edge centred on the axis of the clutch, and located axially outside the ramps 95. The pressure plate 3 has, on its surface facing towards the base portion of the cover plate 8 and in this example formed integrally by moulding, pads 33 which are spaced apart circumferentially at a distance from each other which corresponds to that by which two successive ramps 95 are separated circumferentially, with each pad 33 being adapted to cooperate with one ramp 95.

The ramp means 91 are located axially between the diaphragm 2 and the pressure plate 3, so that the pads 33 receive the ramps 95 and the diaphragm 2 cooperates with the engagement zones 92, which thus constitute the abutment means through which the diaphragm 2 acts on the pressure plate 3.

Because of the presence of the wear compensating device 90, the positions of the diaphragm 2 and the assistance ring 7, in the engaging and disengaging operations of the clutch, are fixed independently of the state of wear of the liners; the assistance to the declutching operation provided by the assistance ring is then independent of such wear, as is the gripping force.

Figure 6:
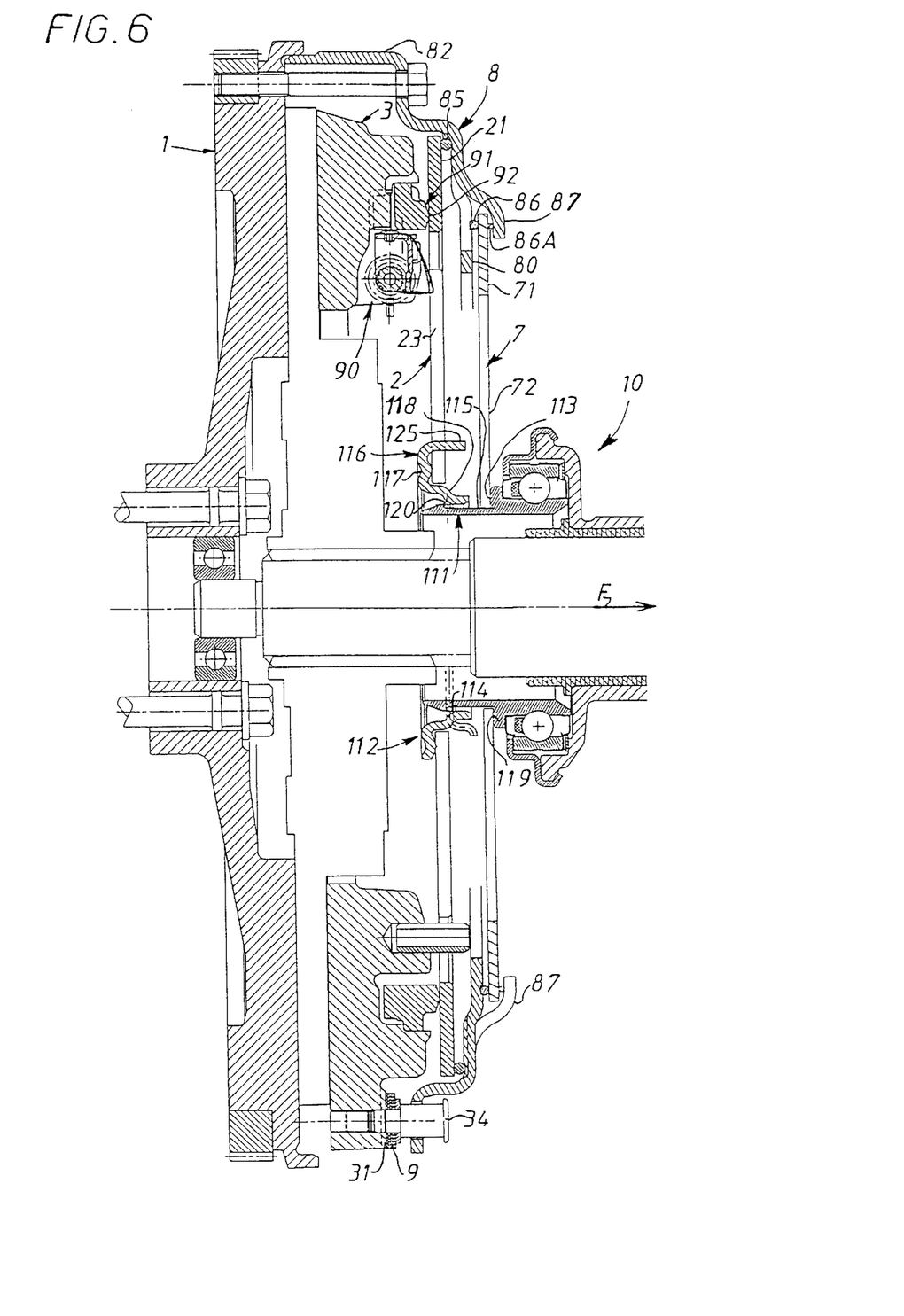
FIG. 6 corresponds to a further version of FIG. 5.

FIG. 6 shows another version of the clutch of FIG. 5; the outer peripheral portion of the assistance ring 7 again bears on the outer face of the base portion 80 of the cover plate 8 through a thrust ring 86, but in this case, the base portion 80 of the cover plate 8 has external retaining lugs 87 which are stamped out and bent, extending towards the axis of the clutch, at an axial distance from the base portion 80 of the cover plate 8 so as to retain the assistance ring 7 axially at its outer periphery; preferably, a thrust ring 86A is located axially between the assistance ring 7 and the lugs 87, which are again spaced apart circumferentially.

Preferably, as shown, the base portion 80 of the cover plate 8 has a circumferential groove for centring the thrust ring 86.

By virtue of these arrangements, the clutch mechanism constitutes a sub-assembly incorporating the assistance ring 7.

Figure 7:
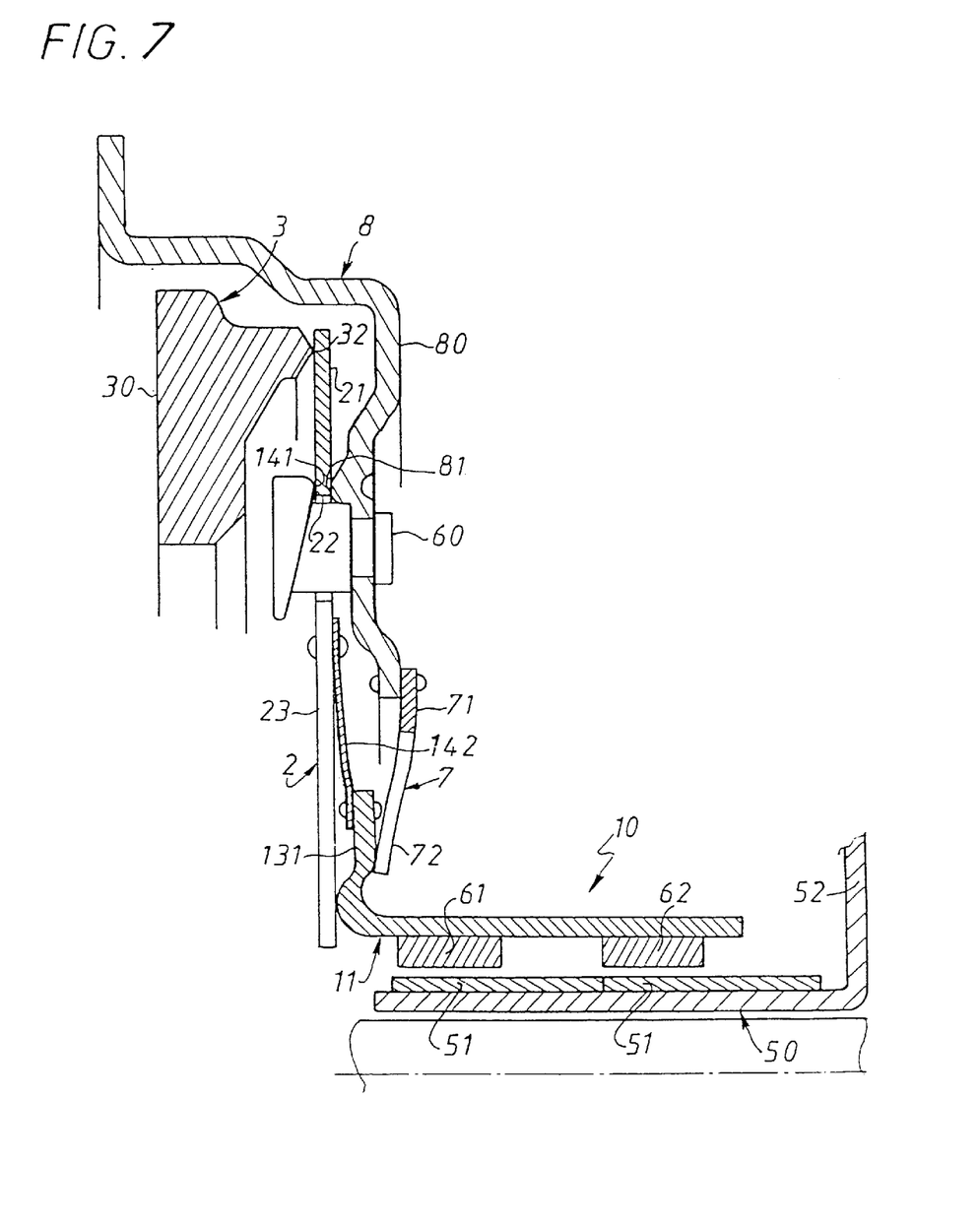
FIG. 7 is a half view in axial cross section, and corresponds to a modified version of FIG. 1.

FIG. 7 shows a clutch of the same type as that shown in FIG. 1.

Here, the diaphragm 2 is mounted for tilting deflection between the primary abutment 81, in the form of a pressed-out element, and a secondary abutment 141 which is constituted by beads, each of which is formed on the head of a spigot piece 60 extending through the diaphragm 2 in the same way as the rivets 6.

In order to disengage the clutch, a thrust is exerted on the inner ends of the fingers 23 of the diaphragm 2 by means of the clutch release device 10, which is also referred to as a declutching actuator, and which in this example does not have any ball bearing. Displacement of the device 10, which is carried in this example by the diaphragm 2, is not controlled by a declutching fork.

More precisely, the declutching actuator 10 comprises an actuating member 11, or actuating element, comprising an actuating sleeve portion which bears directly on the fingers 23 of the diaphragm 2 through a radial engagement flange 131, which is so configured as to bear locally on the fingers 23. This flange 131 is connected to the fingers 23 through resilient tongues 142. These tongues 142 are fixed, in this example by riveting, firstly to the fingers 23 radially in the vicinity of the spigot pieces 60, and secondly to the outer periphery of the flange 131.

The assistance ring 7 acts between the engagement flange 131 and the cover plate 8.

The resilient tongues 142 in this example produce an axial preloading force which biases the engagement flange 131 into contact with the inner ends of the fingers 23, so as to hold the actuating member 11 in permanent engagement against the fingers 23. The force exerted by the assistance ring 7 is zero when the clutch is engaged. This assistance ring 7 has a form similar to that in FIG. 1, and accordingly comprises, firstly, an outer portion in the form of a Belleville ring which is fixed, in this example by riveting, on the base portion 80 of the cover plate 8 in the vicinity of the central aperture in the base portion 80, and secondly, extensions in the form of fingers which extend towards the flange 131 so as to bear on the latter, so that the assistance ring 7 acts on the fingers 23 of the diaphragm through the declutching actuator 10. The assistance ring 7 assists the actuator 10 in the process of declutching, and in this example it is contact with the outer face of the base portion 80, in opposition to the pressure plate 3.

In this example three resiliently axially deformable lugs 142, spaced apart at 120° with respect to each other, are provided. These tongues ensure, jointly, centring of the actuating sleeve 11, coupling of the sleeve 11 in rotation with the diaphragm 2, and axial retention of the sleeve 11 on the diaphragm 2. The declutching actuator 10 in this example is of the concentric type, and comprises two coaxial parts which are arranged concentrically, namely a fixed part comprising a fixed tube 50 carrying on its outside at least one electric winding, and surrounded by an axially movable part which comprises the actuating sleeve 11, which carries on its inside at least one annular permanent magnet which may be continuous or divided into circular sectors.

In this example, the sleeve 11 carries two permanent magnets 61, 62 of opposite polarities, each of which surrounds, with a radial clearance that defines an air gap, an electrical winding 51 carried on the outside of the fixed tube 50, which has a radial flange 52 for fastening it on the casing of the gearbox, which, like the screws by which it is fastened to the flange 52 of the said casing, is not shown.

The fixed tube 50, through which the input shaft of the gearbox is arranged to pass, and the engagement flange 131, are of ferromagnetic material such as steel, or, in another version, a magnetic material.

The windings 51 are connected in series and are wound in opposite senses.

Displacement of the declutching actuator 10 is obtained by energising the windings 51 electrically by means of a control device which is included in an electronic module connected to the ends of the electrical windings 51.

The electronic module also includes a computer which receives information from sensors.

These sensors provide information concerning the rotational velocities of the driving and driven shafts, and the gear ratio engaged.

The computer thus governs the control device in accordance with programs predetermined as a function of the gear ratio engaged and the rotational velocities of the driving and driven shafts.

Thus, by reversing the direction of the electric current in the windings, the actuating sleeve 11 is displaced axially in one direction or the other, and the force for displacing the said sleeve 11 carried by the diaphragm is controlled.

A clutch of the pull-to-release type, including a wear compensating device, has been described with reference to FIGS. 5 and 6.

The clutches in accordance with FIGS. 1, 2 and 7 of the push-to-release type may of course also be, and preferably are, equipped with a wear compensating device.

In another version, the electronic module mentioned above may govern an electric motor controlling in both directions the displacement of the clutch release bearing of FIGS. 1 to 6.

Because of the assistance ring, the motor is of low power.

What is claimed is:

1. A friction clutch, comprising a cover plate (8) with a transversely oriented base portion (80) and fastening means for fastening said cover plate (8) on a rotary driving flywheel, a pressure plate (3) having a front friction surface (30) for cooperation with a clutch friction wheel, means (9) for coupling in rotation, with axial mobility, the pressure plate (3) with the cover plate (8), and, interposed between the pressure plate (3) and the base portion (80) of the cover plate (8), a diaphragm (2) having an outer peripheral portion (21) axially biasing the pressure plate (3) away from the base portion (80) of the cover plate (8) and extending inwardly by fingers (23) for counteracting the action of said peripheral portion (21) through the actuating element (11, 111) of a clutch release bearing (10), a resilient assistance ring (7) acting on the fingers (23) of the diaphragm (2) in the declutching direction with engagement on the cover plate (8), characterized by the fact that the assistance ring (7) is disposed between the cover plate (8) and the actuating element (11, 111) of the clutch release bearing (10), so that it is adapted to apply a force on the fingers (23) of the diaphragm (2) through said actuating element (11, 111) to thereby maintain said actuating element (11, 111) in continuous engagement with the fingers (23) of the diaphragm (2).

2. A clutch according to claim 1, characterized by the fact that the elastic characteristics of the assistance ring (7) are so chosen that, when the clutch is engaged, the clutch friction wheel being new, the action exerted by the assistance ring (7) is very small or zero.

3. A clutch according to claim 2, characterized by the fact that the elastic characteristics of the assistance ring (7) are so chosen that, when the clutch is engaged, the assistance ring (7) exerts a preloading force on the actuating element (11, 111) so as to maintain the actuating element (11, 111) in contact with the fingers (23) of the diaphragm (2).

4. A clutch according to claim 3, characterized by the fact that the elastic characteristics of the assistance ring (7) are so chosen that, during the declutching operation, the action exerted by the assistance ring (7) increases and then decreases to a predetermined value which may be very low or zero, the clutch being disengaged.

5. A clutch according to claim 2 or claim 3, in which the fingers (23) of the diaphragm (2) are separated by radial slots which are open into holes (22) located at the inner periphery of the peripheral portion (21) of the diaphragm (2), the clutch being of the push-to-release type, characterized by the fact that the assistance ring (7) is situated generally radially inwardly of the zone defined by the holes (22) in the diaphragm (2).

6. A clutch according to claim 5, characterized by the fact that the assistance ring (7) bears on the cover plate (8) on the face of the base portion (80) that faces towards the pressure plate (3).

7. A clutch according to claim 6, characterized by the fact that the assistance ring (7) bears on a rounded edge (83) of the central aperture of the base portion (80) of the cover plate (8).

8. A clutch according to claim 5, characterized by the fact that the assistance ring (7) bears on the cover plate (8)

through heads (61) of rivets that pass through the holes (22) in the diaphragm (2), which extend the bodies of the rivets outside the cover plate (8).

9. A clutch according to claim 8, characterized by the fact that the assistance ring (7) is coupled to the cover plate (8) for rotation therewith.

10. A clutch according to claim 9, characterized by the fact that the assistance ring (7) is fixed to the cover plate (8), for rotation therewith, by a bayonet fitting.

11. A clutch according to claim 9, characterized by the fact that the rotational coupling is obtained by means of pins (84) which are carried by the base portion (80) of the cover plate (8) and with which slots (83), formed at the outer periphery of the assistance ring (7), cooperate.

12. A clutch according to claim 2, in which the clutch is of the pull-to-release type, characterized by the fact that the assistance ring (7) bears on the outer face of the base portion (80) of the cover plate (8), preferably through a thrust ring (86).

13. A clutch according to claim 12, characterized by the fact that the base portion (80) of the cover plate (8) has external lugs (87) for axial retention of the assistance ring (7).

14. A clutch according to claim 2, characterized by the fact that the assistance ring (7) is of cut-out form at its inner periphery, so as to define extensions (72) which cooperate with the actuating element (11, 111).

15. A clutch according to claim 2, characterized by the fact that it is equipped with a device (90) for compensating for wear in at least the liners of the clutch friction wheel (5).

* * * * *